United States Patent
Whitebread et al.

[11] Patent Number: 6,148,327
[45] Date of Patent: Nov. 14, 2000

[54] MOBILE AGENT DOCKING ARRANGEMENT FOR ENHANCING AGENT CAPABILITIES

[75] Inventors: Kenneth Robert Whitebread; Russell Ernest Frew, both of Medford; Henry Hindle Mendenhall, Shamong, all of N.J.

[73] Assignee: Lockheed Martin Corp., Camden, N.J.

[21] Appl. No.: 08/741,759

[22] Filed: Nov. 5, 1996

(Under 37 CFR 1.47)

[51] Int. Cl.$^7$ .................................................... G06F 15/16
[52] U.S. Cl. .......................................... 709/202; 709/302
[58] Field of Search .................................... 709/202, 302; 706/10

[56] References Cited

U.S. PATENT DOCUMENTS

| | | | |
|---|---|---|---|
| 5,499,364 | 3/1996 | Klein et al. | 709/202 |
| 5,603,054 | 2/1997 | Theimer et al. | 710/6 |
| 5,638,494 | 6/1997 | Pinard et al. | 709/202 |
| 5,655,081 | 8/1997 | Bonnell et al. | 709/202 |
| 5,768,506 | 6/1998 | Randell | 709/202 |
| 5,822,585 | 10/1998 | Noble et al. | 709/316 |
| 5,850,517 | 12/1998 | Verkler et al. | 709/202 |

OTHER PUBLICATIONS

"Telescript Technology: Mobile Agents" by James E. White, General Magic, Inc. published by Amer. Assoc. for Artificial Intelligence,1996.

"Intelligent Agents: The First Harvest of Softbots Looks Promising", by Sara Reese Hedberg, publ. in IEEE Expert, Aug. 1995, pp. 6–9.

"Harnessing the World Wide Web", by J.A.Sears,US Advanced Research Projects Agency, publ. in IEEE Expert, Aug. 1995, pp. 42–43.

"Intelligent Agents on the Internet: Fact, Fiction and Forecast", by O.Etzioni and D.S.Weld, Univ. of Washington, publ. in IEEE Expert, Aug. 1995, pp. 44–49.

"A1 on the WW–Supply and Demand Agents", by C.Brown, Oregon State Univ.; L. Gasser & D.E. O'Leary, Univ. of So. CA; and A. Sangster, Univ. of Aberdeen, publ. in IEEE Expert, Aug. 1195, pp. 50–55.

*Primary Examiner*—Kenneth S. Kim
*Attorney, Agent, or Firm*—W. H. Meise

[57] ABSTRACT

Intelligent mobile agents are transmitted to computers at remote sites over a network having a relatively limited bandwidth. In order to provide the mobile agents with extended capabilities, yet to allow them to access information in near-real-time, the intelligent mobile agents dock with docking systems at the network nodes. The docking systems respond to the presence of the mobile agents, and provide extended capabilities to the agent. The extended capabilities, in turn, are made available to the various network nodes at which the agents may dock by loading from portable data storage media, or preferably by occasional loading from the network at off-peak times.

5 Claims, 5 Drawing Sheets

6,148,327

MOBILE AGENT DOCKING ARRANGEMENT FOR ENHANCING AGENT CAPABILITIES

FIELD OF THE INVENTION

This invention relates to distributed networks of computers linking computing and data resources, and more particularly to such networks which utilize intelligent mobile agents for performing complex tasks in the presence of limited network bandwidth.

BACKGROUND OF THE INVENTION

Distributed communication systems or networks are now widely used. Such communications systems may be widely distributed information sources such as local- or wide-area networks, corporate or military communication systems, or the world-wide computerized interactive communication system known as the internet. Such communication systems can be used to access remote information or computing resources. When using such systems, it is necessary to know the location or address of the information being sought or of the computing resource to be used, or the user must carry out a search procedure to locate the information. In the case of very large distributed systems which are not indexed, the search is so extensive or time-consuming that it may be impractical, and may therefore not be attempted.

There has been interest in the use of intelligent mobile agents for overcoming some of the problems associated with searches of distributed, possibly unindexed, data bases or computing resources. An intelligent mobile agent is a computer program which can independently or semi-independently perform tasks which the operator could not perform on his own because of the time or effort required for the task. For example, an intelligent mobile agent might be used to discover information autonomously, or under its own control, because the operator or user of the distributed communication system might not be aware of the existence of a source of useful information, or of its address if its existence were known. The mobile intelligent agent is a computer-type program characterized by the ability to move over the communication system from one computer to another while the program is "running"; in fact, it is necessary for it to do so in order to perform its tasks. This does not, of course, mean that the bit pattern of the program changes while it is in transit from one computer to the other, but rather means that, in performing its tasks or "running," the program moves its location from one computer to another. Intelligent mobile agents or "softbots" are described in the following references:

1) "*Intelligent Agents: The First Harvest of Softbots Looks Promising*", Sara Reese Hedberg, IEEE Expert.
2) "*Harnessing the World Wide Web*", Jay Allen Sears, U.S. Advanced Research Projects Agency, IEEE Expert.
3) "*Intelligent Agents on the Internet: Fact, Fiction, and Forecast*", Oren Etzioni and Daniel S. Weld, University of Washington, IEEE Expert.
4) "*AI on the WWW—Supply and Demand Agents*", Carol Brown, Oregon State University; Les Gasser and Daniel E. O'Leary, University of Southern California; Alan Sangster, University of Aberdeen, IEEE Expert.
5) "*Telescript Technology: Mobile Agents*", James E. White, General Magic, Inc., American Association for Artificial Intelligence.

One problem which has been found with the use of such mobile agents for seeking information on a distributed computing or knowledge base is that the capability of the agent is more or less related to the size or complexity of the program which embodies the intelligent mobile agent, so that a highly capable mobile agent, just like a highly capable computer program of any sort, tends to be very large in terms of the number of bytes which it contains. The length of time required to transmit the intelligent mobile agent from one computer to another over the communication system depends upon the bandwidth of the system in bits or bytes per second. It may not be practical to use a highly capable intelligent mobile agent, because the large size of such an agent requires excessive computer-to-computer transmission time. If the bandwidth of the distributed communication system can be controlled, then its bandwidth can simply be expanded in order to accommodate the desired mobile agents at the desired speed. Ordinarily, the communication system or data base is a given, and its bandwidth cannot be controlled. It should be noted here that limitations in the bandwidth of a part of a computer which interacts with the communication system will have the same effect, as to that computer, as a limitation of the bandwidth of the communication system itself; it is therefore desirable to use the highest possible speed modem at each computer site. Under bandwidth-limited conditions, the use of a highly capable intelligent mobile agent may result in excessive transmission time delays, and these directly impact the time required for the intelligent mobile agent to perform a search. The amount of time which is considered to be excessive may depend upon the information sought and its importance. If search time is irrelevant, a highly capable intelligent mobile agent may be used on a low-bandwidth distributed computing or network. Ordinarily, however, large transmission times are undesirable because of the resulting delays in receiving the search results, especially in those cases in which real-time information is sought. Thus, if a very complex search is required to find the desired information, a highly capable intelligent mobile agent capable of performing the search may be too large to be practical under given circumstances. The inability to quickly transmit highly capable intelligent mobile agents prevents full utilization of the resources of the communication system.

Improved methods are desired for transmitting highly capable intelligent mobile agents over communication systems interlinking distributed computing systems.

SUMMARY OF THE INVENTION

A distributed communication network includes a plurality of computers, and communication paths for coupling the computers together for communications therebetween. The network also includes standardized computer network software associated with each of the computers, for providing basic network communications between or among the computers; this may, in one embodiment of the invention, be software suitable for use with a world-wide communication system commonly known as "internet." The network according to the invention also includes a mobile agent generating program located at one or more of the computers of the network, for generating, and for transmitting over the communication network to at least one other computer of the network, agents for performing a desired function. The dimensions of a mobile agent are related to its capability, whereby highly capable agents may be so large as not to be usable, because of network bandwidth limitations. A mobile agent docking arrangement is located at each computer of the network, which capability expander is capable of coacting with the mobile agents, for rendering the agents active at that computer. According to an aspect of the invention, a mobile agent capability expander is located at, or associated with, at least one of the computers of the network which is capable of coacting with mobile agents, for extending at least one capability of a mobile agent. This enhances the capability of mobile agents used in the system without expanding limited network bandwidth. In a particular embodiment of the invention, the information embodying the capability enhancement or expander is transmitted over the communication network to the agent-receiving computer (s) at infrequent intervals, during which the communication network is otherwise lightly loaded, so that the capability expander is available at such later time at which a mobile agent arrives. In another embodiment of the invention, the capability enhancement may be uploaded to the agent-receiving computer(s) from a portable memory, such as a floppy disk.

DETAILED DESCRIPTION OF THE INVENTION

Figure 1:
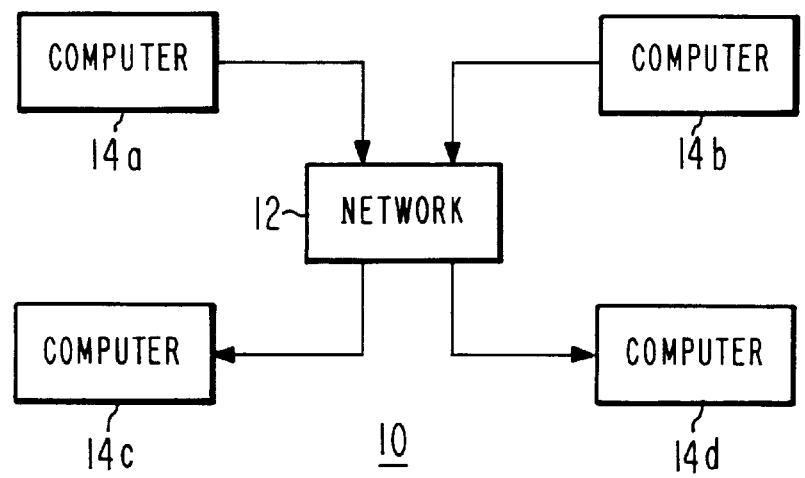
FIG. 1 is a simplified block diagram of a communication system which can use intelligent mobile agents in accordance with an aspect of the invention.

In FIG. 1, a communication system designated generally as 10 includes a network 12 and four representative computers 14a, 14b, 14c, and 14d connected to the network. As mentioned above, each computer in a prior-art system is capable of sending intelligent mobile agents out to any of the other three computers. Such mobile agents can be generated at each of computers 14 by the use of a language such as agent TCL, available from the computer science division of Dartmouth College, Dartmouth, N.H., and can be transmitted, by way of the network 12, to the other computers after its generation. The bandwidth of a network such as network 14 varies from about 4800 baud or bits-per-second to as much as tens of megabaud, and may vary within the network, depending upon which network branch is considered.

Figure 2:
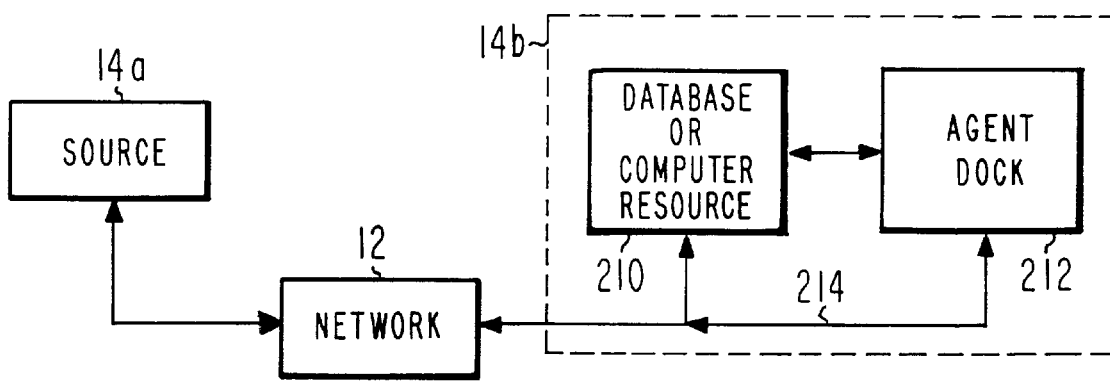
FIG. 2 is a simplified block diagram of a portion of the communication system of FIG. 1.

FIG. 2 is a simplified block diagram of an arrangement according to the invention, which is similar to a portion of the arrangement of FIG. 1. In FIG. 2, a source of intelligent mobile agents is illustrated as 14a, which is the same designation as that of computer 14a of FIG. 1. Element 14a of FIG. 2 is designated as a "source", because in the most basic system, it needs only to transmit or launch a mobile agent. The active agent goes onto the network from element 14a of FIG. 2, and performs its tasks, moving from computer to computer as necessary. If the mobile agent is programmed to return to source 14a when its task is completed, then source 14a must also be capable of receiving the information conveyed by the mobile agent. While source/sink 14a of FIG. 2 need not be a computer, it will ordinarily be such.

Also in FIG. 2, network 12 is connected to a second "computer" block 14b, which may include a database 210 and an agent dock 212. Database 210 may be simply a memory which can be accessed by an intelligent mobile agent, in which case block 14b must further include a processor or "computer", because the intelligent mobile agent must reside, at least temporarily, at location 14b. Instead of a database such as 210, agent dock 212 could be coupled to any other data or computing resource which is to be acted upon by an intelligent mobile agent. As also illustrated in FIG. 2, database 210 is coupled to agent dock 212, and the network 12 is also connected to agent dock 212.

The intelligent mobile agent is a program. In an ordinary computer system, blocks 210 and 212 of location 14b of FIG. 2 may be hardware, or they may be programs (software) which are resident at location 14b. Agent dock 212 of FIG. 2 has the ability to interface or interact with the intelligent mobile agent, and also provides the intelligent mobile agent with capabilities which reside at location 14b. Such capabilities might include access to knowledge bases, additional computational functions, and the like.

Figure 3:
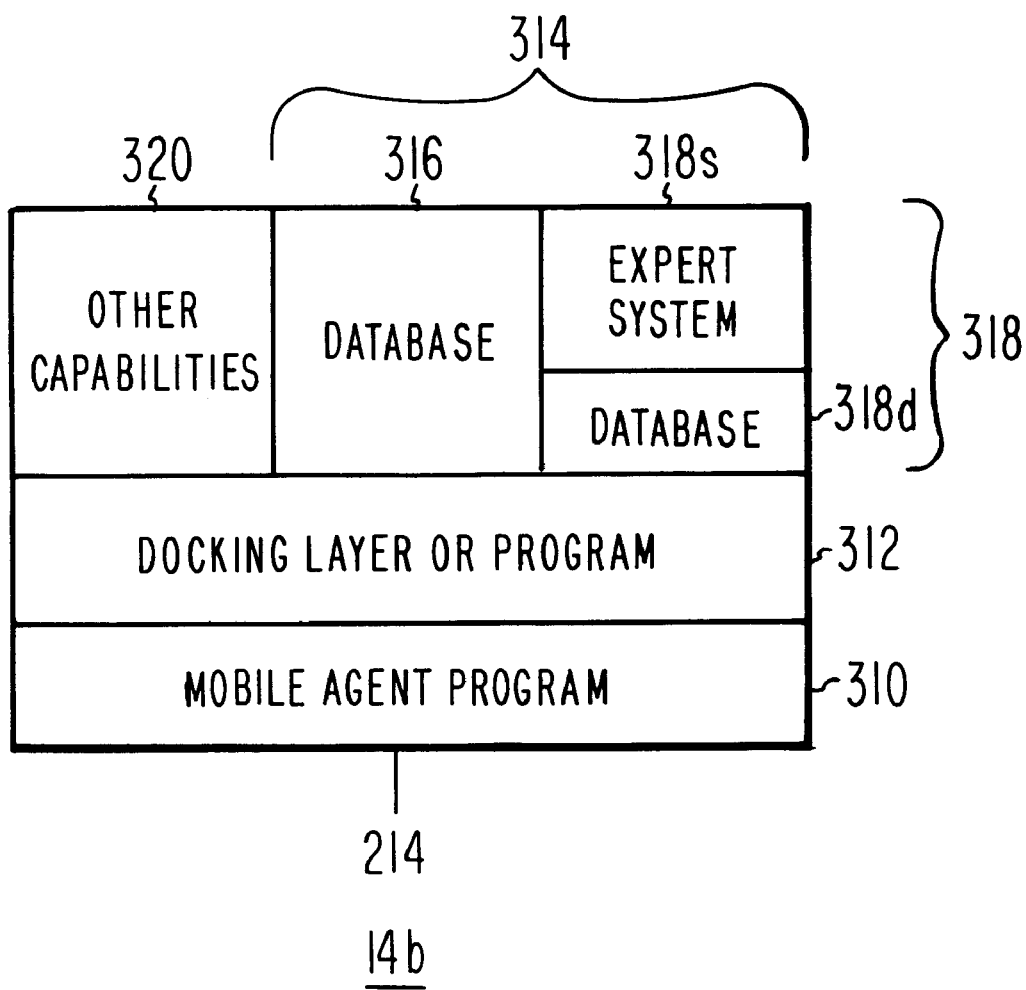
FIG. 3 is a simplified architecture diagram illustrating the relationship of the agent docking of FIG. 2 to the agent.

FIG. 3 is a simplified architecture diagram which represents the software in the agent dock 212 of FIG. 2. In FIG. 3, the intelligent mobile agent 310 appears at the bottom of block 212, adjacent to the path 214 by which it arrives at the dock. When docked, mobile agent 310 interfaces with a docking software layer 312, which recognizes the presence of the mobile agent, and which enables the mobile agent by effectively "pushing its ON button", to cause the intelligent mobile agent to recognize that it has arrived at a new location, and to enable it to execute its program or instructions. Location 14b also includes a knowledge base illustrated as 314.

Following the turn-on or enabling of the then-resident intelligent mobile agent 310 of FIG. 3, the docking layer 312 acts as a service provider to the intelligent mobile agent 310. For example, the intelligent mobile agent may indicate to the docking layer that the mobile agent is a search agent which is looking for particular data. Such data, in a military context, might be the presence, location, or identity, or all of this information, relating to electromagnetic radiators which might have been located by specialized equipment available at location 14b. It may happen that the computer at location 14b has no specialized equipment for generating the type of data which the intelligent mobile agent seeks, in which case the docking layer 312 of FIG. 3 so advises the agent 310. In that event, the agent may go elsewhere in the network (to another computer location 14a, 14b, 14c, 14d, . . . ; of FIG. 1), or return to its source with a failure message. On the other hand, if the docking layer 312 knows that such information is available in its knowledge base 314, it advises the intelligent mobile agent 310 of that fact, and of other relevant capabilities available. For example, in the context of an electromagnetic emitter locator, location 14b might have a database 316 containing raw data representing frequency and pulse characteristics of a received electromagnetic signal, and might also have an expert system 318 which is capable of evaluating the raw data, and which may have already evaluated the raw data, and have identified an emitter as being, for example, a weather radar operating at a particular physical location (which, in general, is not the same as a network location). On the other hand, location 14b might have the raw data represented by database 316, and the knowledge base required as the foundation for an expert system for identifying the emitter, but might not include the expert system itself.

In general, expert systems include two distinct portions, a knowledge base and a decision-making portion. The decision-making portion is typically much smaller than the knowledge base. However, the knowledge base changes from time to time as more information becomes available, and as conditions change. For example, in the medical fields the knowledge about the symptoms and progress of newly discovered diseases may not be in an older knowledge base, but, when such information is included in an updated knowledge base, the same types of decision-making programs can operate on the updated information in order to identify, and suggest treatment for, such newly discovered diseases. Similarly, in the abovementioned military application, the knowledge base 318d of FIG. 3 can be updated with the operating frequency, pulse characteristics, and other spectral characteristics of new radar and other emitter types as they become known, which the decision-making portion 318s of the expert system can then use to identify this new type of radar if the raw data is indicative of its presence. Layer portion 320 represents other capabilities which might be available to the intelligent mobile agent.

Thus, the docking layer 312 of FIG. 3 "tells" the then-resident mobile agent of layer 310 about the existence of the raw data available in database 316, and of the existence of either the knowledge base 318d of, or of the entire expert system 318, and also about any other available capabilities 320 which are relevant to the task which the intelligent mobile agent has identified.

Once the intelligent mobile agent 310 of FIG. 3 has received information from the docking layer about the available capabilities, the intelligent mobile agent decides, based upon its program, which of the locally available capabilities it wishes to avail itself of. The docking layer facilitates obtaining the information from the raw-data database or the expert system, or from a stand-alone knowledge base, as required.

The information in expert system database 312 of FIG. 3 can be updated in any of a number of ways. For example, the database 312 can be updated by occasional transmissions over the network 12. While these transmissions may require substantial bandwidth, they are performed infrequently, and may be performed at low data rates, over extended intervals during low-traffic times. In the arrangement of FIG. 3, the expert system and a current database therefor are available to the intelligent mobile agent, without transmitting the entire expert system and its database each time an inquiry is made by transmission of an intelligent mobile agent. The knowledge base 318d may be updated by a memory upload provided by a maintenance worker from a memory disk, or from any other physical media.

Figure 4:
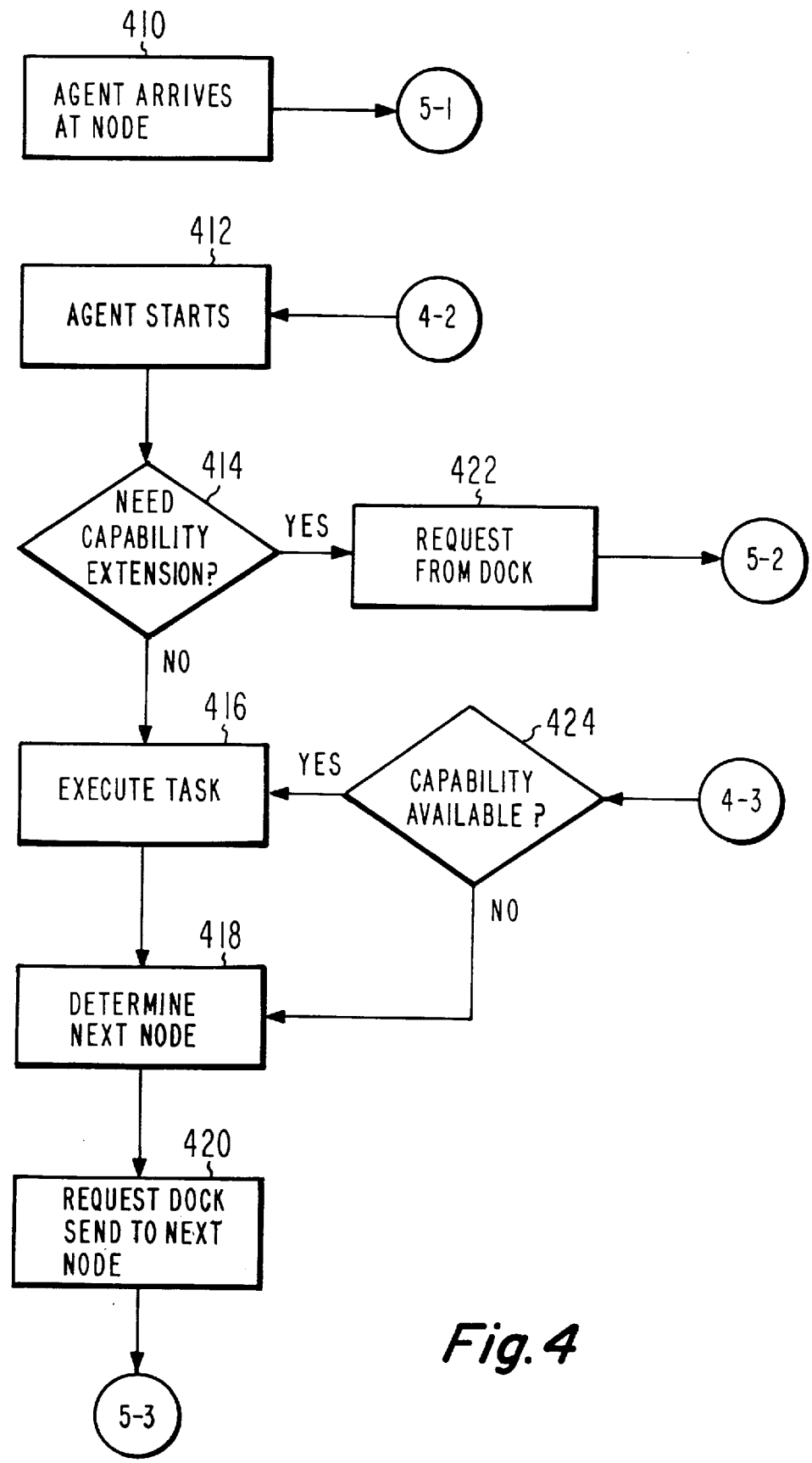
FIG. 4 is a simplified flow chart illustrating a typical intelligent mobile agent.
Figure 5:
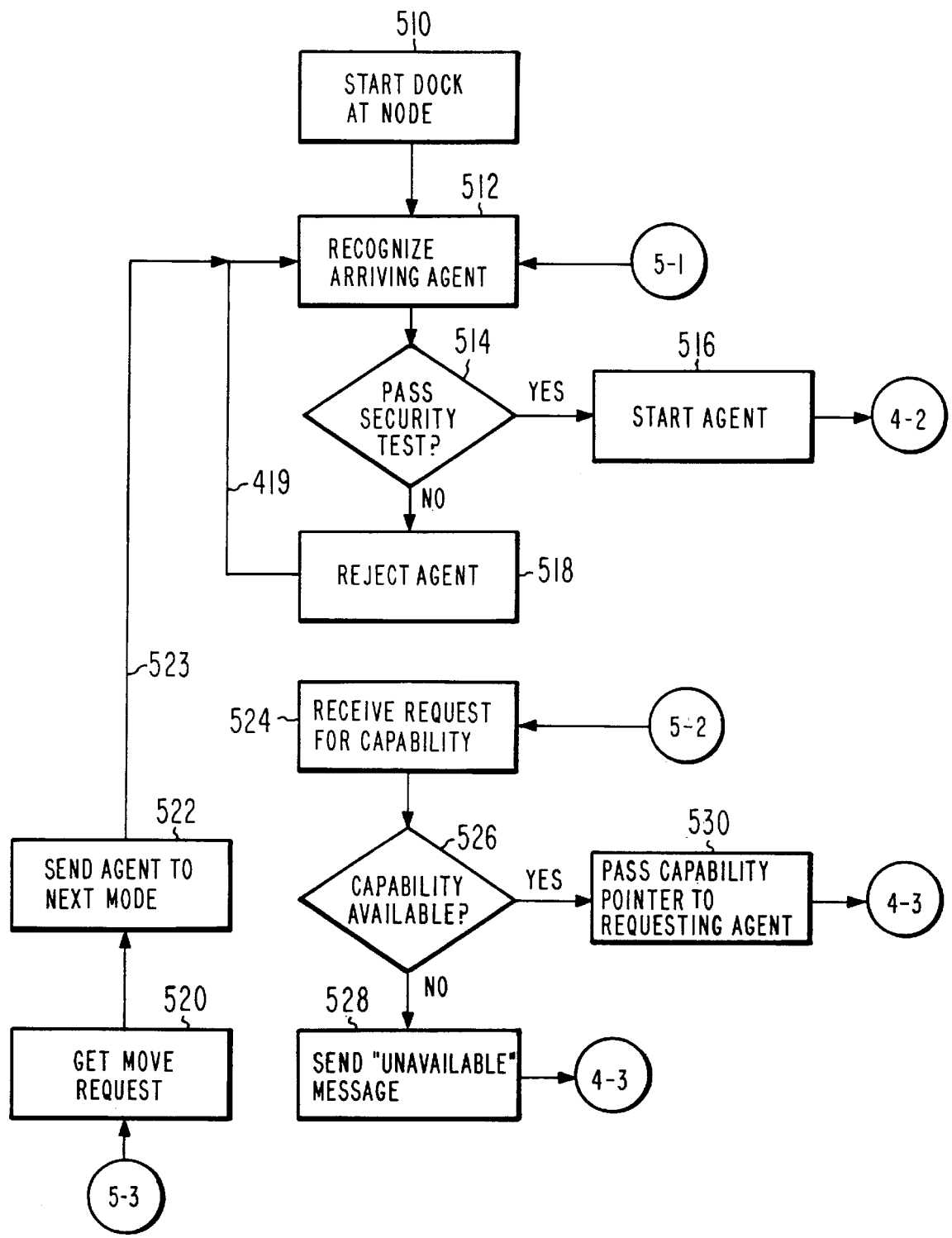
FIG. 5 is a simplified flow chart illustrating a docking layer such as that of FIG. 3.

FIG. 4 is a simplified flow chart illustrating the operation of a typical mobile agent 310 in accordance with the invention, and FIG. 5 is a simplified flow chart illustrating the operation of the docking system 312. The sequence of events begins with the arrival of a mobile agent at a network node (network site) or an agent dock, as suggested by block 410 of FIG. 4. The sequence representation then flows to a logic node 5-1, which represents a transfer of the sequence to a corresponding logic node 5-1 of FIG. 5. Logic block 510 represents a start point for the docking program, which starts up the logic, and then goes into a "wait" state, waiting for arrival of an agent at the node. From logic node 5-1 of FIG. 5, the logic flows to a block 512, which represents recognition by the logic flow of the docking system 312 that a mobile agent has arrived at the network node. The recognition represented by block 512 may be accompanied by a verification of a security code, following which the docking system logic flows to a decision block illustrated as 514. Decision block 514 decides whether the currently arrived agent has clearance to coact with this network node. If the mobile agent does not meet the security requirement, the logic leaves decision block 514 by the NO output, and flows to a block 518, which represents rejection of the mobile agent. The logic of the agent docking system then returns by a logic path 419 to block 512, whereupon the docking system continues to monitor for the appearance of an active agent at its network node.

If a mobile agent arrives at the network node and meets the established security criteria, the logic leaves decision block 514 of FIG. 5 by way of the YES output, and flows to a block 516, which represents a command for the starting of the mobile agent. From block 516, the logic flows by way of a logic node 4-2 to block 412 of FIG. 4. Block 412 of FIG. 4 represents the starting of the mobile agent in response to the command issued by logic block 516. From logic block 412, the logic flows to a decision block 414, which decides whether the mobile agent requires capability extension. This decision may be as simple as the examination of an "extension required" flag associated with the mobile agent. If no capability extension is required, the logic flows from decision block 414 by way of its NO output, and arrives at a block 416. Block 416 represents performance of the task assigned to the mobile agent by its internal programming. Once the task is completed, the logic flows from block 416 to a block 418. Since the mobile agent has completed its task, it must now decide whether it must return to the originating source with its data, or to seek more data by going on to a known further address, or search randomly by going to an address which has not yet been visited. Block 418 represents the decision as to where the mobile agent is to go next. From block 418, the logic flows to a block 420, which represents an instruction to the docking system to command the transmission of the mobile agent to the selected address. From logic block 420 of FIG. 4, the logic then flows by way of a logic node 5-3 to logic block 520 of FIG. 5, which represents acceptance of the direction to move the mobile agent to a defined network node. Block 522 represents the sending of the mobile agent to its next destination, and the logic then flows by way of a path 523 back to block 512.

In the event that the mobile agent requires extension of its capabilities, the logic flow is as described above until the logic arrives at decision block 414 of FIG. 4. In the case in which the mobile agent requires capability extension, the logic leaves decision block 414 by the YES output, and flows to a block 422, which represents making a request for a particular extension of capabilities from the docking system. It must be recognized that the network may have many nodes having different capabilities, and may have various kinds of mobile agents perambulating therethrough, seeking various different types of capabilities, not all of which are available at each network node. From block 422 of FIG. 4, the logic flows by way of a logic node 5-2 to a block 524 of FIG. 5. Block 524 represents the reception of a request for a particular type of extension capability. From block 524, the logic of the docking system flows to a decision block 526, which looks through its index of available capabilities to see if the requested capability is available. If the capability is not available at this particular network node, the logic leaves decision block 526 by the NO output, and flows to a block 528, which represents the sending of a "not available" signal to the mobile agent. From block 528 of FIG. 5, the control flows by way of a logic node 4-3 to decision block 424 of FIG. 4. Since the capability sought by the mobile agent is not available at this particular network node, the logic of the mobile agent leaves decision block 424 by the NO output, and flows to block 418. As described above, block 418 represents the determination of the location of the next network node to be visited by the mobile agent; from block 418, the logic passes through the states represented by logic blocks or nodes 420, 5-3, 520, and 522, back to block 512, which represents a "waiting for a mobile agent" state of the docking system.

As so far described, the cases which have been discussed in relation to FIGS. 4 and 5 are those in which (a) the mobile agent was not authorized to act, and was rejected; (b) was authorized to act, but did not require capability extension; (c) was authorized to act, and required capability extension, but the particular capability extension was not available at the network node or site. The next possibility is that the mobile agent arriving at the network node is authorized, requires capability, and the capability is available. In this last case, the logic will arrive at decision block 526 of FIG. 5 as described above, but, since the requested capability is available, the logic will leave by the YES output, rather than NO. From the YES output of decision block 526, the logic flows to a block 530, which represents the passing of a capability pointer to the requesting mobile agent. Logic node 4-3 returns the sequence flow to decision block 424 of FIG. 4, whereupon the logic leaves decision block 424 by the YES output, and flows to block 416, which as mentioned above represents the performance of the task, which presumably also means availing itself of the extended capabilities at the network node.

Thus, the described arrangement allows highly capable intelligent agents of relatively small size to be transmitted over limited-bandwidth networks for performing their functions, with the extended capabilities being made available at the appropriate remote network locations. Portable storage media may be used to take extended capability information to each computer remote computer. In some cases, it may instead be desirable to load the extended capability information into the computer by using the limited-bandwidth network, albeit at a data rate commensurate with network capabilities, by transmission over a period of time, preferably at a time when the network is lightly loaded.

Figure 6:
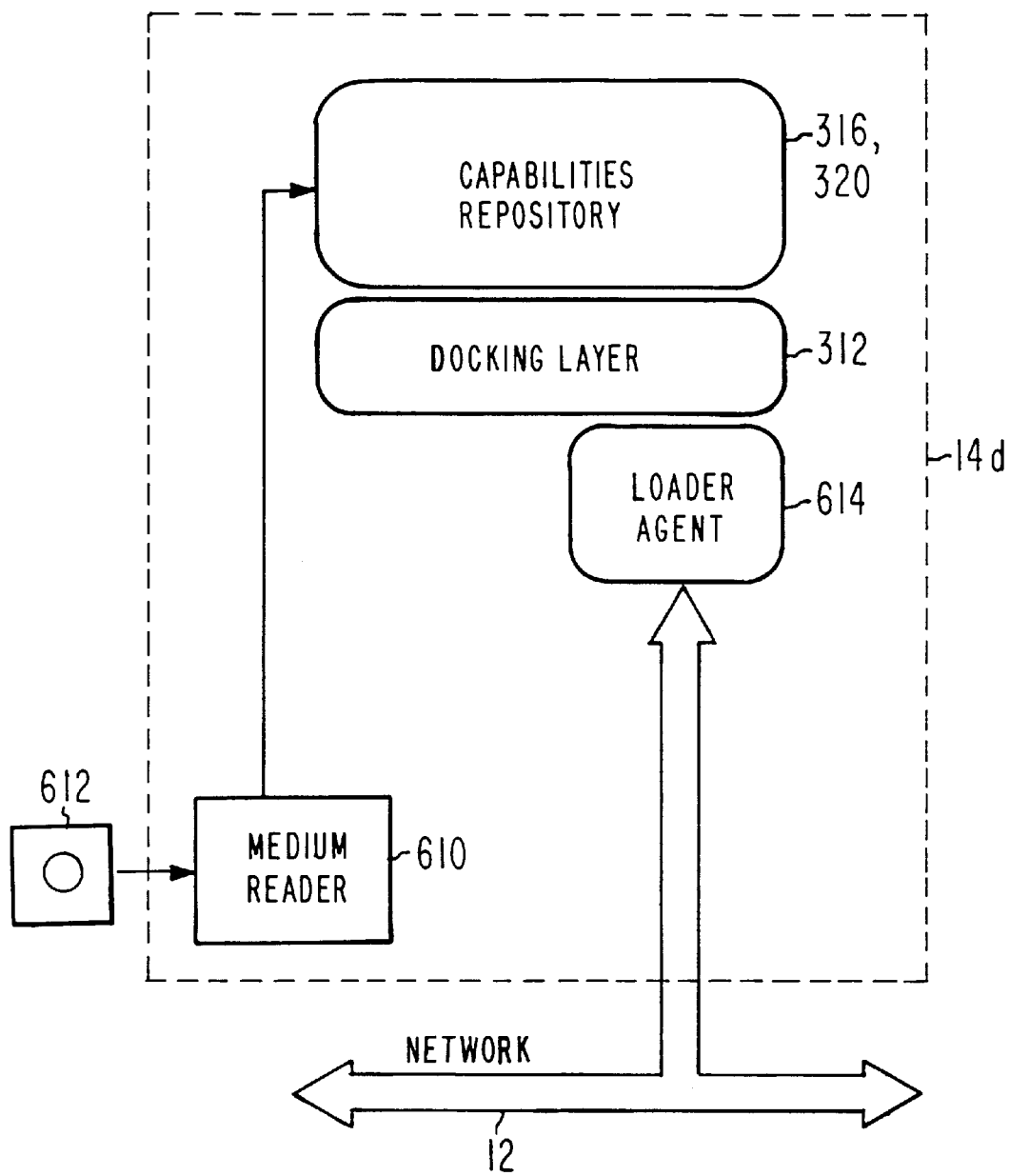
FIG. 6 is a simplified block diagram illustrating various arrangements for loading extended capability information into a computer at a remote location on the network.

FIG. 6 is a simplified block diagram illustrating three different arrangements for loading extended capability information into a computer at a remote location on the network so that it may be accessed by the docking system of that computer in response to the docking of a mobile agent. In FIG. 6, representative node 14d includes a medium reader, such as a floppy-disk reader 610, which is coupled to a capabilities repository, corresponding to the database, expert system, or the like of FIG. 3. Updates of the capability can be manually transported to the node on a data medium, illustrated as a floppy disk 612, and uploaded by means of the reader 610. Another way to update the knowledge base is by a mobile agent, illustrated as Loader Agent 614, which is especially adapted for uploading or deliver of such information from a remote site during periods of low traffic on the network. Instead of using a mobile agent to control the updating, control could be accomplished manually by an operator at a remote site, with the delivery of the update information being performed over the network. It will be clear that updates over the network must be accomplished in the presence of sufficient security to guarantee that unwanted intrusion does not occur. The physical transmission by way of a data medium may also require security measures to assure that the knowledge base is not updated by someone having physical access but without authority to update.

Thus, a distributed communication network (10) according to the invention includes a plurality of computers (12), and communication paths (14) for coupling the computers (12) together for communications therebetween. The network also includes standardized computer network software, such as TCP/IP, IP, NFS, SLIP, and the like, associated with each of the computers (12), for providing basic network communications between or among the computers; this may, in one embodiment of the invention, be software, such as TCP/IP, suitable for use with a world-wide communication system commonly known as "internet." The network according to the invention also includes a mobile agent generating program, such as Agent TCL, located at one or more of the computers (12) of the network (10), for generating, and transmitting over the communication means (14) to at least one other computer of the network, an agent for performing a desired function. The dimensions of a mobile agent are related to its capability, whereby highly capable agents may be so large as not to be usable because of network bandwidth limitations. A mobile agent docking arrangement (312) is located at each computer (14a, 14b, 14c, 14d) of the network (10) which is capable of coacting with the mobile agent, for rendering the mobile agent active at that computer. According to an aspect of the invention, a mobile agent capability expander (312, 318) is located at at least one of the computers (14b) of the network (10) which is capable of coacting with mobile agents, for extending at least one capability of a mobile agent. This enhances the capability of mobile agents used in the system without expanding limited network bandwidth.

Other embodiments of the invention will be apparent to those skilled in the art. For example, any of various means might be employed to realize network communications, generation of mobile agents, and installation and update of agent-extension capabilities at the nodes of the network. Networking communications among nodes might be implemented by means other than hard-wired TCP/IP links. Such variants might include wireless-based or infrared systems, asynchronous transmission mode (ATM) systems, or serialized approaches such as SLIP and PPP. Also, other languages and mechanisms for specifying and generating mobile agents may be used. For example, Telescript, originating from General Magic, Inc., or Java, originating from Sun Microsystems, could be used. Agent generation may also be accomplished by a generating program built on, for example, the Unix Operating System Remote Procedure Call.

What is claimed is:

1. A distributed communication network, comprising:

a plurality of computers;

communication means for coupling said computers together for communications therebetween;

standardized computer network software associated with each of said computers, for providing basic network communications between said computers by way of said communication means;

mobile agent generating means located at at least one of said computers of said network, for generating mobile agents for performing a desired function, and for transmitting said mobile agents over said communication means, the dimensions of each of said mobile agent being generally related to its capability, whereby highly capable mobile agents may not be usable because of network bandwidth limitations;

mobile agent docking means located at each computer of said network which is capable of coacting with said mobile agents, for rendering said agents active at said coacting computer; and mobile agent capability expanding means located at at least one of said coacting computers of said network, for extending at least one capability of a mobile agent received at said one of said coacting computers of said network, whereby the capability of said mobile agent may be enhanced.

2. A communication network according to claim 1, wherein one of said communication mobile agent generating means and one of said mobile agent docking means are located together at at least some of said computers of said network.

3. A method for operating a communication system, comprising the steps of:

coupling together a plurality of computers, located at different sites, by way of a network defining a bandwidth, which bandwidth may differ at various locations throughout said network;

communicating among said computers by way of said network, using communication software at each said computer which adheres to a communication standard;

at at least one of said sites, generating mobile agents for performing a desired function, and transmitting said mobile agents onto said network to at least one other computer, whereby said bandwidth of said network may prevent a highly capable mobile agent from being transmitted and received in a suitably short length of time;

preloading into said at least one other computer a mobile agent docking means, which is capable of rendering said mobile agents active at said one of said sites;

preloading into said at least one other computer a mobile agent capability expanding means, for extending at least one capability of a mobile agent received at said one of said computers of said network, whereby the capability of said mobile agent may be enhanced.

4. A method according to claim 3, wherein said preloading of said capability expanding means further comprises the step of:

transmitting said capability expanding means over said network to said one of said computers at a time when the traffic load on said network is low.

5. A method according to claim 3, wherein said preloading of said capability expanding means further comprises the steps of:

physically transporting said capability expanding means to the site of said one of said computers in the form of a recording on a data medium: and using an appropriate medium reader, reading said recording and transferring said capability expanding means to said one of said computers.

\* \* \* \* \*